FIG. 1

INVENTORS
WILLIAM JACOBS
ROBERT L. NORTON

ATTORNEYS

INVENTORS
WILLIAM JACOBS
ROBERT L. NORTON

ATTORNEYS

March 31, 1970     W. JACOBS ET AL     3,503,541
MULTIBEVERAGE DISPENSER
Filed July 17, 1968     8 Sheets-Sheet 6

INVENTORS
WILLIAM JACOBS
ROBERT L. NORTON
BY
Wolf, Greenfield + Hieken
ATTORNEYS

March 31, 1970 W. JACOBS ET AL 3,503,541
MULTIBEVERAGE DISPENSER
Filed July 17, 1968 8 Sheets-Sheet 8

FIG. 11

INVENTORS
WILLIAM JACOBS
ROBERT L. NORTON
BY
ATTORNEYS

United States Patent Office 3,503,541
Patented Mar. 31, 1970

3,503,541
MULTIBEVERAGE DISPENSER
William Jacobs, Chestnut Hill, and Robert L. Norton, Norfolk, Mass., assignors to Jet Spray Cooler, Inc., Waltham, Mass., a corporation of Massachusetts
Continuation-in-part of abandoned application Ser. No. 682,344, Nov. 13, 1967. This application July 17, 1968, Ser. No. 753,825
Int. Cl. B67d 5/56
U.S. Cl. 222—129.1                  19 Claims

ABSTRACT OF THE DISCLOSURE

A beverage dispenser with a visual display bowl containing carbonated water and having a multivalve assembly with each valve individually connected to a flavor syrup source and to the bowl to dispense a variety of beverages from a single machine.

---

This is a continuation-in-part of our earlier copending application Ser. No. 682,344, filed Nov. 13, 1967 and now abandoned entitled Multi-Beverage Dispenser.

This invention relates to beverage dispensers and more particularly comprises a beverage dispenser and valve assembly capable of dispensing a variety of carbonated or non-carbonated beverages.

Jacobs et al. Patent No. 3,225,965, dated Dec. 28, 1965, discloses apparatus for carbonating and dispensing beverages. That dispenser is capable of handling a single beverage, and separate dispensers are required for separate beverages. In one aspect, the present invention is directed to a modification of that beverage dispenser so as to make it suitable for dispensing a variety of carbonated beverages from the single machine. Another aspect of the present invention is the valve assembly which makes it possible for the single dispenser machine to handle a variety of different beverage flavors. The valve assembly is not only suitable for use as part of a dispenser of the type shown in the Jacobs et al. patent supra, but further, the valve assembly has use on a fountain counter where no visual display of the beverage is provided such as is derived from the Jacobs et al. structure, but rather the flavor and water and carbonating medium are supplied from a remote location.

One important object of this invention is to provide a single machine which is capable of carbonating and dispensing a plurality of beverages at the same time.

Another important object of this invention is to eliminate excessive foaming of carbonated beverages as they are dispensed from a beverage dispensing machine.

Another important object of this invention is to provide a beverage dispenser valve assembly which is capable of being used with a variety of different types of beverage dispensers to effectively convert them from a single beverage dispenser to one capable of handling a variety of beverages at the same time.

Yet another important object of this invention is to provide a beverage dispenser valve assembly which is capable of being mounted on a fountain and which is capable of being readily connected to a variety of flavor syrups and a source of water so as to dispense a variety of different beverages.

And another important object of this invention is to provide a beverage dispenser valve assembly which is capable of discharging carbonated or non-carbonated water alone or mixed with one of a variety of different flavor syrups.

And yet another object of this invention is to provide a beverage dispenser valve assembly which can discharge water in a high velocity jet or in a relatively low velocity flow.

Still another important object of this invention is to provide a valve assembly for mixing water and flavor syrup, which is capable of compensating for variations in pressure under which the water and/or flavor syrup are fed to the valve so as to maintain a constant ratio of the two.

And another important object of this invention is to provide a multiflavor valve for beverage dispensers that prevents the beverage in the valve from warming up during periods of non-use.

To accomplish these and other objects, the beverage dispenser of this invention includes a stand and a bowl mounted on the stand. A refrigeration system is provided in the stand with an evaporator coil disposed in operative relationship to the bowl so as to cool any liquid which is in the bowl. A multibeverage dispensing valve assembly is supported on the stand and has a plurality of individual dispensing valves, each having its own actuator. Means are provided for directing water into the bowl and from the bowl into each one of the valves, and means are also provided for directing a flavor syrup to each of the valves. A valve closure is provided in each valve, which is actuated in response to movement of the actuator for discharging water from that valve fed from the bowl and for simultaneously discharging the particular flavor syrup connected to that valve. The valve assembly has utility apart from use with a beverage dispenser of the type shown in the drawing. Typically it can be used on a fountain and be connected to sources of carbonated water and a variety of syrups in the cellar or below the fountain counter.

These and other objects and features of this invention along with its incident advantages, will be understood and appreciated from the following detailed description of several embodiments thereof, selected for purposes of illustration and shown in the accompanying drawing, in which:

FIG. 11 is a schematic diagram of a modification of this invention.

Figure 1:
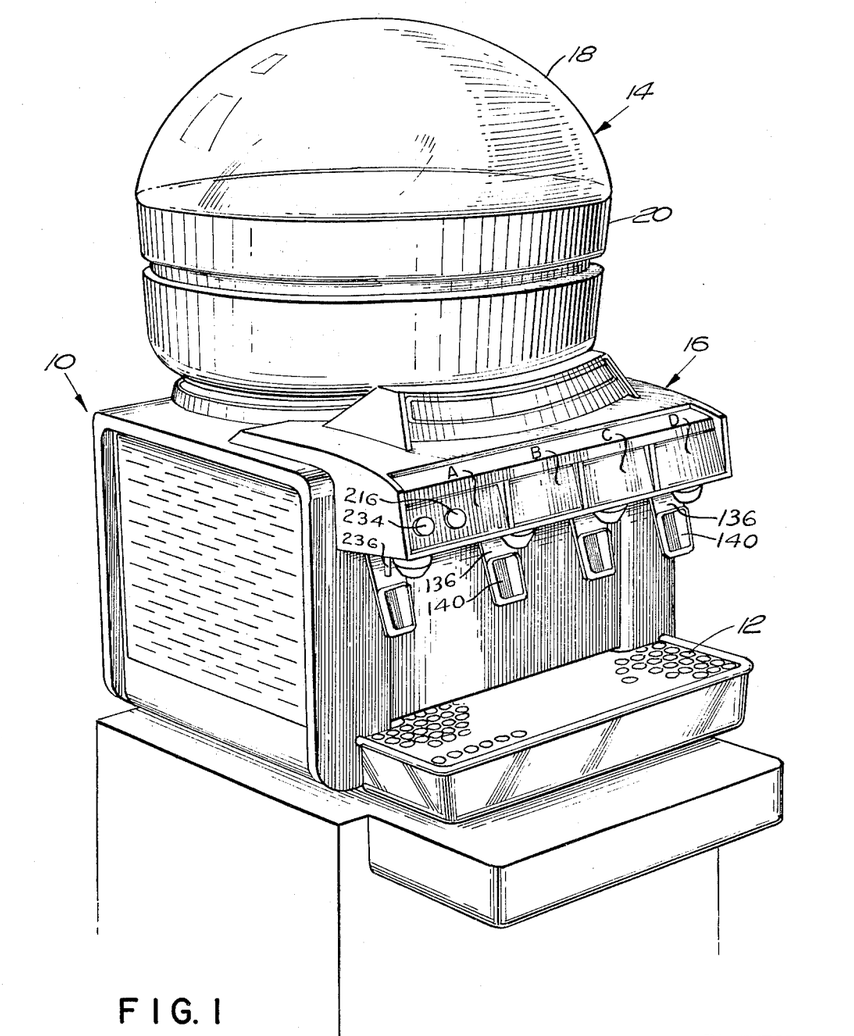
FIG. 1 is a perspective view of a multibeverage dispenser constructed in accordance with this invention.
Figure 7:
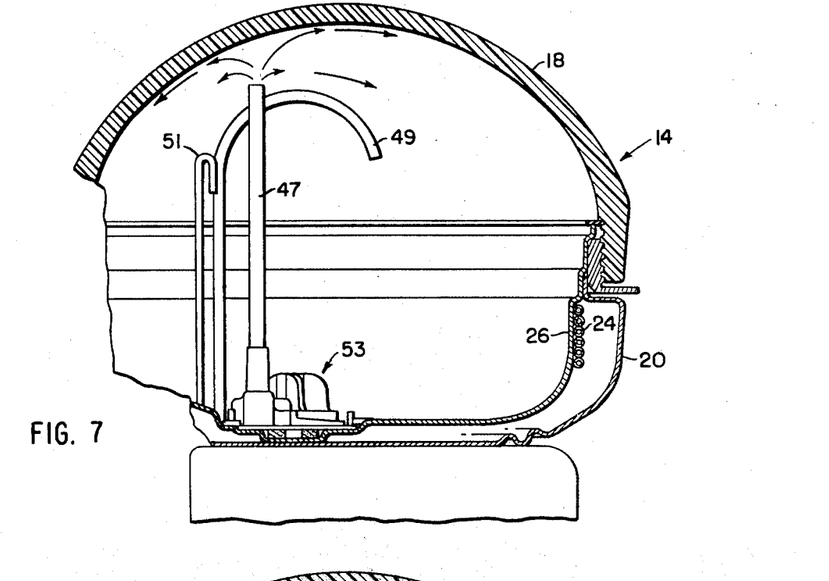
FIG. 7 is a fragmentary cross sectional view of the bowl of the dispenser shown in FIG. 1.

The beverage dispenser shown in FIG. 1 includes a stand 10 having a drip tray 12 on which cups to be filled may be placed, a bowl 14 disposed on the stand and a valve assembly 16 from which the separate beverages may be dispensed. As shown in FIG. 7, the bowl 14 is generally composed of two parts; namely, a clear plastic dome 18 and a base 20 made out of corrosion resistant non-magnetic material such as stainless steel. Within the base 20 evaporator coils 24 are provided in contact with the inner skin 26 so as to be in heat exchange relationship with any liquid which is contained within the bowl 14. Extending into the bowl through a fitting 28 provided in the base 20 are seven inlets, four of which identified by numeral 30 are provided to introduce water into the bowl and a sixth inlet 34 is provided to introduce carbon dioxide into the bowl, and the last inlet 38 vents the bowl when desired. A second fitting 39 in the bowl provides five outlets 41, four for each of the four flavor syrups and a fifth outlet 43 for withdrawing carbonated water from the bowl.

Four parallel coils of stainless steel tubing 45 are wound in a spiral on the bottom of the bowl, and each is connected to one of the syrup inlets 30 and one of the outlets 41. Thus, the syrups which are used to flavor the different beverages discharged by the dispensing valve assembly 16 are cooled in the bowl 14 by virtue of the heat exchange relationship between the stainless steel coils 45 which contain the flavor syrups and the water in the bowl. It is also evident in FIG. 7 that a standpipe 47 is connected to the water pump so that the water fed to the bowl 14 may be discharged against the dome 18 to form a fountain-like display within the bowl. This action is identical to that described in connection with the Jacobs et al. patent, supra, as well as in several earlier patents issued to Jacobs. Another standpipe 49 may be connected to the vent 38 with the top of the standpipe turned over as shown in FIG. 7, and yet another standpipe 51 may be connected to the carbon dioxide inlet 34.

As in the Jacobs et al. patent, supra, a circulating pump 53 is also provided in the bowl 14, which is preferably driven magnetically as is the circulating pump shown in that patent. The pump is adapted to draw water which is in the bowl into the pump and direct it upwardly through the standpipe 47 and against the dome 18. Another port (not shown) is provided in the pump for circulating the water into the bowl. That is, the pump has a discharge port which is oriented generally tangentially to the side skin 26 of the bowl base 20 so as to cause the water in the bowl to circulate about the skin. This motion of the water obviously promotes the heat exchange relationship between the water and the refrigeration coils 24 of the evaporator.

Figure 2:
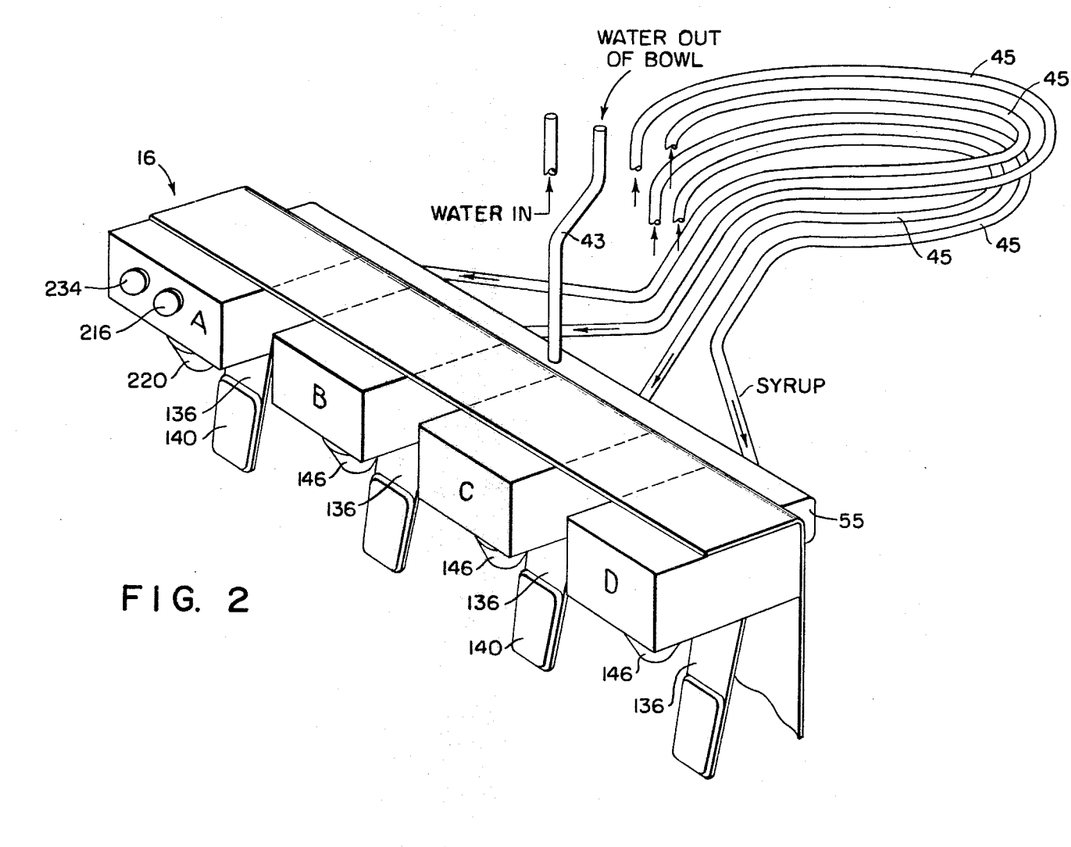
FIG. 2 is a perspective view of the beverage dispenser valve assembly and some of its associated tubing which forms part of the beverage dispenser shown in FIG. 1.
Figure 2:
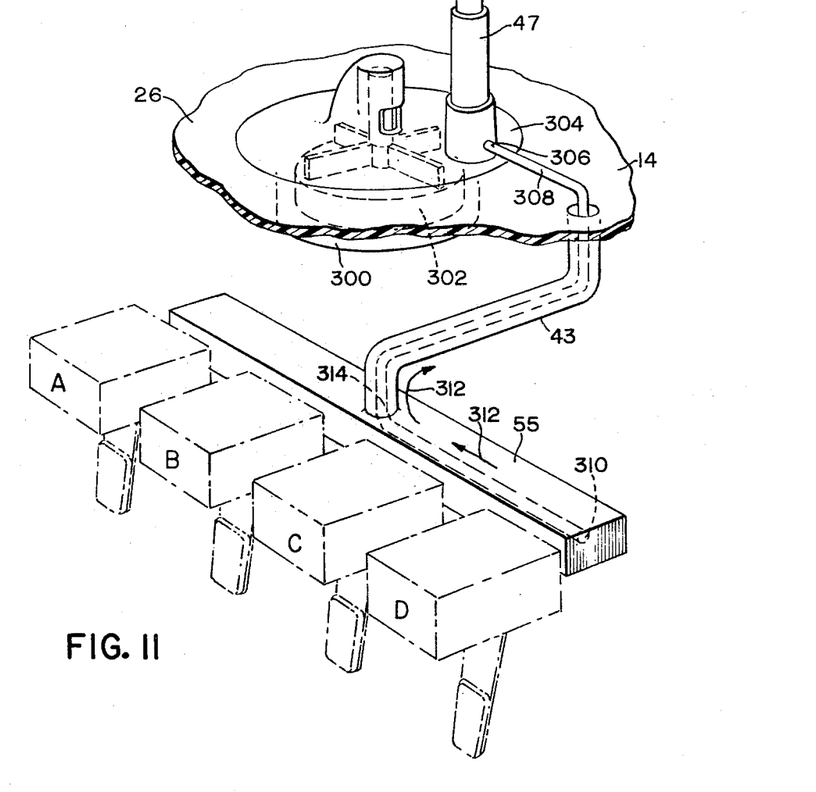

As shown in FIG. 2, the valve assembly 16 has a manifold 55 connected to the water outlet 43, and the manifold is positioned to supply each of the valves A, B, C and D with water. As indicated above, four valves are provided in the embodiment shown, and the left valve A differs slightly from the others. That is, the valves B, C, and D are identical, but the valve A on the left in FIG. 2 is different in that it is capable of discharging either a mixture of water and flavor syrup or water alone.

Figure 3:
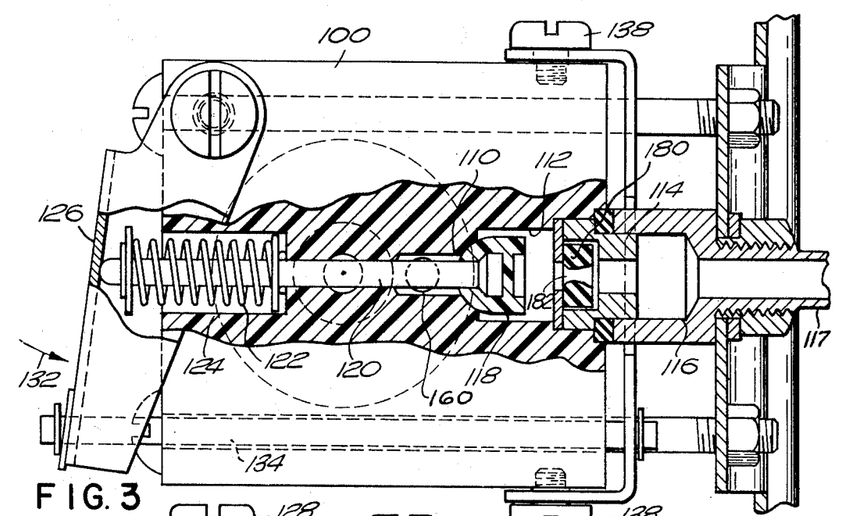
FIG. 3 is a plan view, partly in section, of one of the valves in the valves assembly.
Figure 4:
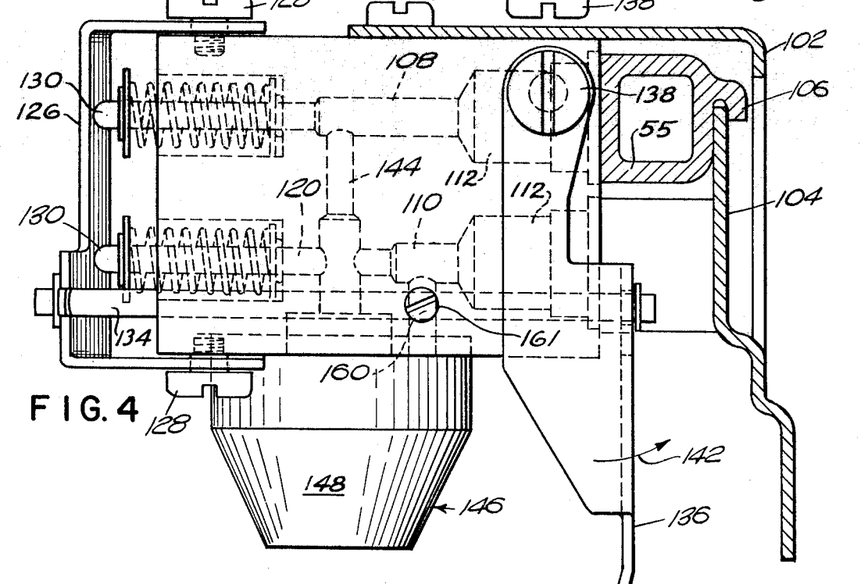
FIG. 4 is a side view of the valve shown in FIG. 3.

FIGS. 3 and 4 illustrate one of the valves B, C or D. Referring now to FIGS. 3 and 4, the valve shown in formed within a block 100 which is supported on a bracket 102 having a central vertical offset portion 104 that supports the manifold 55. The manifold is provided with a hook 106 that hangs on the offset portion 104 as is shown in FIG. 4. In FIG. 4, a pair of horizontal passages 108 and 110 are disposed one above the other and the top passage 110 is connected to one of the ducts carrying flavor syrup from the fitting 39. Basically the two passages operate in the same manner to control the flow through each, and the details of the lower passage 110 through which the syrup flows is shown in detail in FIG. 3. The passage 110 includes an enlarged inlet portion 112 connected through fitting 114 to the threaded nipple 116 which is secured to the duct 117 leading from the bowl and carrying the syrup. Valve closure 118 is disposed in the chamber 112, and its position is controlled by valve stem 120 which is biased to the position shown in FIG. 3 by the spring 122 within the enlarged counter bored portion 124 of the passage 110 at the front of the block 100. Thus, the valve closure 118 is normally biased to the closed position shown in FIG. 3, but it may be opened by pushing the stem 120 against the bias of spring 122, rearwardly in the block 100.

As is evident in FIG. 4, the passages 108 and 110 are both controlled by the same type of valve closure and stem arrangement, and each is biased to the closed position by the springs. Each of the stems 120 is simultaneously actuated by a pivotally mounted pusher plate 126 carried by shoulder screws 128 which define a vertical pivotal axis for the pusher plate. The forward ends 130 of the valve stems 120 bear against the inner surface of the pusher plate 126, and when the pusher plate is moved on the shoulder screws 128 in the direction of arrow 132 in FIG. 3 the stems 120 move to unseat the valve closures 118 from the valve seats defined at the forward ends of the enlarged chambers 112. The pusher plate 126 is connected by a connecting rod 134 to the actuator 136 which is supported for pivotal movement about a horizontal axis defined by the shoulder screws 138. The actuator 136 includes a pad 140 which is clearly visible in FIGS. 1 and 2 and against which a glass to be filled is pushed so as to pivot the actuator rearwardly as suggested by the arrow 142 in FIG. 4.

The passage 108 which received water from the manifold discharged that water through a vertical passage 144 which extends downwardly from the passage 108. The passage 144 is intersected by the passage 110, and thus the syrup valve stem 120 as it moves back and forth in the passage 110 is washed by the water discharged through the passage 108 into the nozzle 146.

Figure 9:
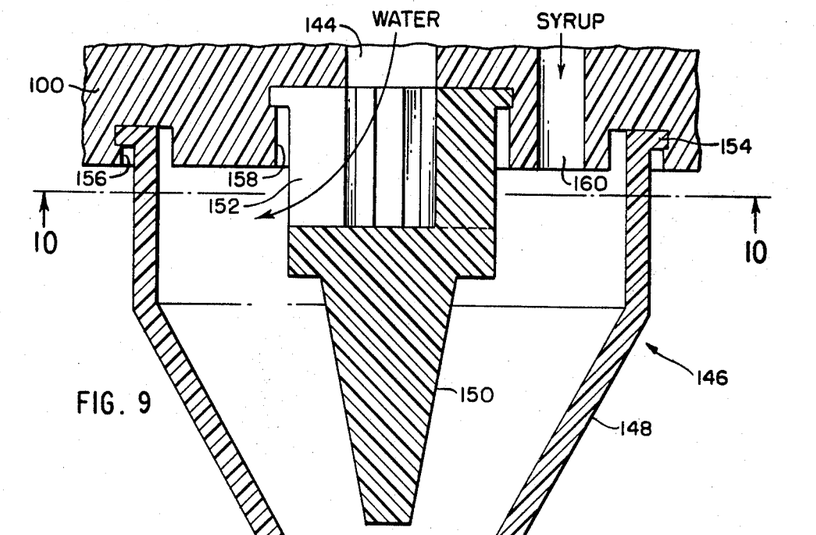
FIG. 9 is a cross sectional view of the dispenser nozzle.
Figure 10:
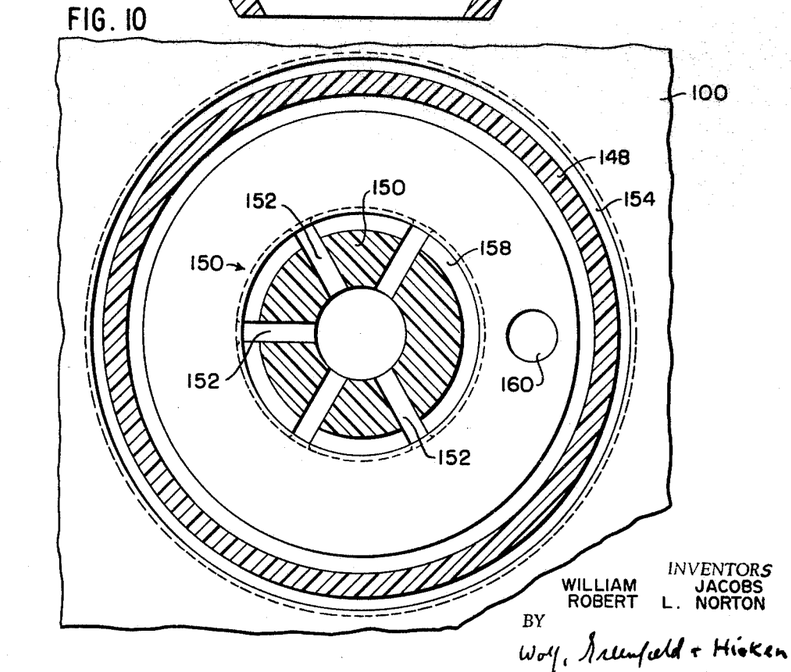
FIG. 10 is a cross sectional view of the nozzle taken on section line 10—10 of FIG. 9.

Certain details of the nozzle 146 are shown in FIG. 9. The nozzle includes a generally funnel-shaped body 148 within which is positioned a water mixing nozzle 150. The water discharged through the passage 144 passes to the top of the mixing nozzle 150, from which point it is discharged radially in the top of the nozzle body 148 through the various radial passages 152. A radial discharge of the water in the nozzle 146 tends to mix the water thoroughly with the flavor syrup which is discharged into the nozzle body 148 to the side of the mixing head as is shown in FIG. 9. In FIG. 4, passage 160 is shown to lead from the passage 110 into the nozzle 146 to the side of the mixing head 150. No radial discharge of water takes place directly at the location of the discharge 160, and the absence of water discharged at the direction of the syrup tends to reduce the amount of foam generated without detracting from the thorough mixing of the water and the syrup at the nozzle.

The nozzle body 148 includes an outwardly extending flange 154 as shown in FIG. 9 which fits into a shallow undercut recess 156 provided in the bottom of the block 100, and as the nozzle 148 is made of a flexible plastic material such as acetal, it may be snapped into and out of the shallow recess 156 for thorough cleaning. Similarly, an undercut recess 158 is provided in the block to receive the mixing nozzle head 150.

It is evident from the foregoing description that when the actuator 136 is pushed rearwardly as viewed in FIG. 1 or to the right as viewed in FIG. 4, the valve closures provided in the syrup and water lines both open simultaneously, as the two rods are aligned with one another vertically and lie the same distance from the pivotal axis of the pusher plate established by the shoulder screws 138. Consequently, water and syrup are both discharged into the nozzle body 148 where they are thoroughly mixed and flow into the container disposed on the drip pan 12 connected to the stand 10. In order to promote a constant ratio of water and flavor syrup with changes in the water head or syrup head upstream of the valve closures, preferably each of the passages 108 and 110 is provided with a rate of flow control in the form of a variable orifice. One such device is shown in FIG. 3 at 180. The variable orifice flow control 180 is in the form of a flexible annulus having an orifice 182 which changes in diameter with changes in pressure exerted against its upstream side. That is, when the pressure increases on the right side of the flow control device 180 as viewed in FIG. 3, the device is compressed because of its rubber characteristic, and compression of the member reduces the size of the orifice 182. Thus, with increases in pressure, the orifice size is reduced so as to maintain the flow through the orifice at a constant rate. Similarly, a rate control member may be positioned in the water passage 108 at its inlet fitting, so as to achieve the same effect. In addition, a needle valve 161 may be provided in the passage 160 as suggested in FIGS. 3 and 4 so as to provide fine tuning of the mixture to tailor it to the type of syrup being used. Generally, however, the mixture is controlled by the two flow control devices 180 found in each of the two major passages.

Figure 5:
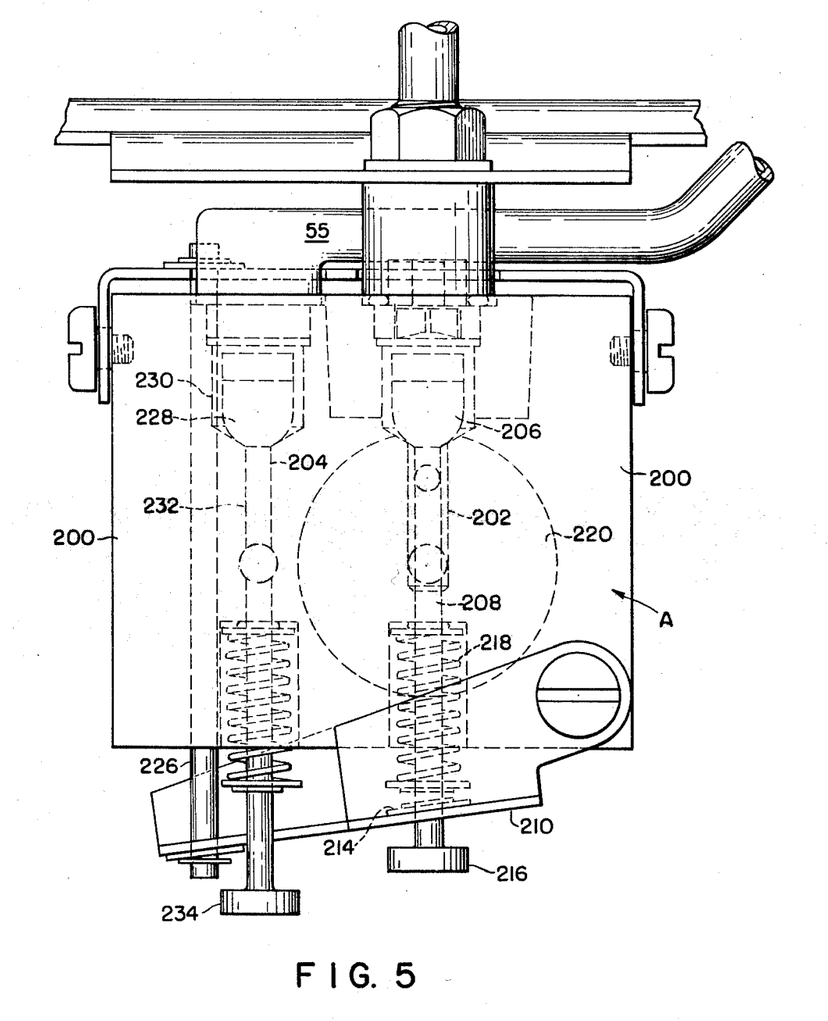
FIG. 5 is a plan view of another of the valves forming part of the valve assembly shown in FIG. 2.
Figure 6:
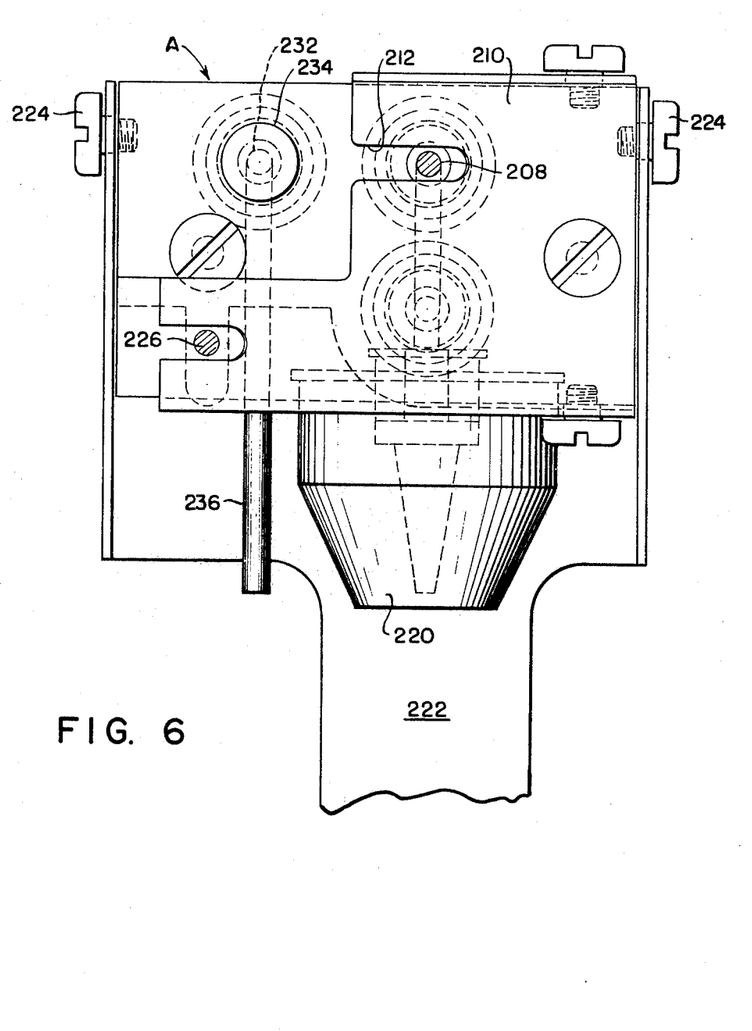
FIG. 6 is a front view of the valve shown in FIG. 5.

While in the valve shown in FIGS. 3 and 4 actuation of the actuator always results in the flow of both syrup and water through the nozzle 146, assuming of course that both are in ready supply to the block 100, in the valve A shown in FIG., 5, a mixture of water and syrup, water alone, or a water jet may be supplied depending upon the manner in which the valve is actuated. In FIG. 5 the block 200 is shown to include two water passages 202 and 204. The water passage 202 is aligned vertically with a syrup passage as suggested in FIG. 6, and the water passage 202 and the syrup passage are identical to the corresponding passages 108 and 110 in the embodiment of FIGS. 3 and 4. The water pasasge 202 is shown in FIG. 5 to be controlled by a valve 206 carried by a stem 208 which extends through the pusher plate 210. It will be noted in FIG. 6 that a slot 212 is provided in the plate 210 to allow the rod 208 to extend through it. The stem which controls the valve in the syrup passage is identical to the stem 120 shown in FIG. 3, and it terminates on the rear side of the plate 210 so as always to be actuated by the plate when the plate is moved rearwardly in the manner described above. The stem 208 carries a ring 214 which is larger than the width of slot 212, and the ring 214 which is secured to the stem 208 serves as a bearing surface against which the plate 210 bears as it is moved rearwardly so as to actuate the stem 208 and open the valve 206. However, as is evident in FIG. 5, the stem 208 carries a knob 216 in front of the plate 210 and which affords the customer an opportunity to move the stem 208 independently of the plate 210. That is, the stem 208 may be moved against the bias of its spring 218 by pushing against the knob 216, and this action will unseat the valve 206 and allow water to flow through the passage 202 and discharge through the nozzle 220 while the syrup passage remains closed. Thus it will be appreciated that when the actuator 222 is pushed rearwardly as shown in FIG. 6, it will pivot on its shoulder screws 224 and draw the plate 210 rearwardly by virtue of its connection with the connecting rod 226 in the same manner as the embodiment of FIGS. 3 and 4. However, when it is desired to draw water alone from the valve A the user may depress the knob 216 so as only to open the water passage.

The second water passage 204 is provided to discharge a jet of water under substantial pressure in a fine stream. The passage 204 is controlled by its valve 228 disposed in the enlarged portion 230 of the passage 204, and it is in turn controlled by a stem 232. The stem 232 carries a knob 234 at its free end, similar to the knob 216, so that the valve 228 may be unseated by pushing the knob. When the valve 228 is unseated, water is allowed to flow from the source to the passage 204 to the vertical high pressure spout 236 which delivers a fine high pressure stream. As is evident in FIG. 6, the plate 210 is cut away in the vicinity of the knob 234, so that actuation of the plate 210 has no effect upon the knob 234 and its associated stem 232. Therefore, when the pusher actuator 222 is actuated, it does not open the passage 204, but rather, that passage can only be opened manually by depressing the knob 234 as an operation independent of the plate 210 and the knob 216. Thus, it will be appreciated that the valve A as shown in FIG. 2 not only is capable of discharging a flavored drink by conventionally moving the actuator 136, typically by pressing a cup against the pad 140, but further, the valve A may be used to discharge water alone from the manifold 55 by depressing the knob 216, and further it may be used to discharge a high pressure jet of water by depressing the knob 234.

Figure 8:
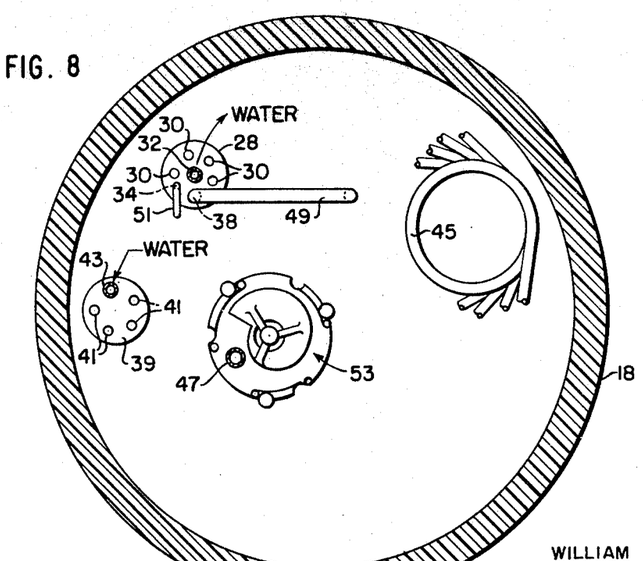
FIG. 8 is a fragmentary plan view of the bowl bottom.

From the foregoing description it will be appreciated that the valve assembly shown in FIG. 2 may be used in a variety of ways. In FIG. 1 it is shown embodied in a visual display beverage dispenser having a bowl 14 within which the water to be mixed with the flavored syrup is sprayed against the dome and circulated so as to be refrigerated by the coils of the evaporator which are disposed in the dome shell. Each one of the four valves, A, B, C and D which comprise the assembly 16 are connected with a coil in turn connected to a source of flavor syrup, and the coils as suggested in FIGS. 2 and 8 chill the syrup by placing the syrup in heat exchange relationship with the cold water in the bowl. The valves A, B, C and D are also connected by the manifold 55 to the water in the bowl, so that when any one of the actuators 136 is pushed rearwardly, it discharges a mixture of water and flavor syrup. The pump disposed in the bowl which discharges the water through the standpipe also serves to circulate the water about the refrigeration coils which are disposed outside the skin 26 and further causes the water to flow over the syrup coils 45 so as to most effectively cool them. The valve A which forms part of the assembly 16 is provided with the two separate control knobs 216 and 234 which permit the customer to draw water alone through the nozzle 220 of that valve and further allow the customer to draw a high pressure jet of water by actuation of the knob 234.

Independent of its use as part of the carbonated beverage dispenser of the variety shown in FIG. 1, the valve assembly 16 can be used on a fountain counter so as to dispense a variety of different soft drinks. Typically, the assembly 16 can be mounted on a counter with its manifold 55 connected to a source of carbonated water in the cellar of the establishment where it is used. Further, each of the valves A, B, C and D could be connected independently through their respective fittings to a different source of flavor syrup disposed beneath the counter. Such an assembly used in combination with a drip tray or some similar arrangement is eminently suited to be used in such a fashion. So long as a cold water or carbonated water is supplied to the manifold, and different flavor syrups are connected to the respective valves, the assembly may be used to dispense a variety of beverages. It is also to be understood that while in the embodiments shown the assembly is comprised of four such valves, plainly a smaller or greater number could be used in the manner shown. Further, the assembly may include none or one or more of the valves A. An infinite variety of combinations is of course possible.

In FIG. 11 a modification of this invention is shown which improves the performance of the valve assembly particularly when it is used in combination with a beverage dispenser of the variety shown in FIG. 1. In FIG. 11 the bowl 14 is shown schematically with a well 300 provided in its bottom on the inner skin 26, which receives the magnetically driven pump 302 that may be identical to the pump in Patent No. 3,225,965, supra. As in the embodiment of FIGS. 2 and 7, a duct 43 conveys the water from the bowl 14 into the manifold 55, and the water in the manifold may be directed through any of the four valves (or more if desired) connected to it. The four valves shown in FIG. 11 are identified as A through D. The water is fed through the duct 43 to the manifold 55 by gravity in the particular dispenser shown.

In the absence of special means to circulate the water in the manifold 55, it is evident that with prolonged nonuse, the water in it will warm somewhat as compared to the water temperature in the bowl itself. For example, overnight, when no beverages are drawn from any of the valves A through D, the temperature of the water in the manifold may elevate to a temperature of 40° F. as compared to the water temperature of 35° F. in the bowl proper. While a temperature of 40° F. is satisfactory to provide a refreshing drink, that temperature may create excessive foaming of the beverage first drawn from the dispenser after the period of non-use. That is, until the temperature of the water in the manifold 55 is reduced by dispensing the water which has been in the manifold overnight and replacing it with water from the tank at the temperature of approximately 35° F., the beverages which are drawn from the valves will tend to produce excessive foam that will spill out of the cup when the cup is filled, or alternatively reduce the capacity of the cup. This difficulty is overcome by the modification shown in FIG. 11.

In FIG. 11 it will be noted that the cover 304 has an additional outlet 306 for directing water from the pump directly into the manifold 55. The outlet 306 from the pump is directly connected to a water duct 308 which extends along the bottom of the bowl 14 and through the line 43 into the manifold 55. In the embodiment shown, the duct 308 terminates adjacent valve D at one end of manifold 55. It is evident that when the pump 302 operates, it will continuously force water from the interior of the bowl 14 out the opening 306 and through the line 308 so that it discharges through the end 310 of the duct directly into the manifold. This flow will in turn displace water in the manifold as suggested by the arrows 312. Consequently, a constant circulation of water through the manifold will take place, which will maintain the temperature of the water in the manifold very close to the temperature in the bowl. It will be apparent that while a single duct 308 is shown, the portion of the duct 308 adjacent the bottom of the line 43, as the region 314, could carry a T-fitting with a second line extending from the T to the opposite end of the manifold adjacent the valve A. In such a setting water would be directly circulated from the pump through the duct 308 and then to the opposite ends of the manifold. In this arrangement the temperature of the water in the manifold would be constant throughout. On the other hand, if an arrangement as shown in the drawing is used, there may be a degree or two gradient between opposite ends of the manifold. In such a case, the single duct provided would advisably be directed to that end of the manifold which carries the valve that is most commonly used.

It will be understood that the pump cover 304 not only is provided with outlet 306 which feeds the duct 308 but it also provided with an outlet which directs water through the standpipe 47. Preferably yet another outlet is provided (not shown) generally in the plane of the outlet 306, which circulates the water in the bowl 14 so that it is in good heat exchange relationship with the refrigeration coils on the outside of the skin 26.

From the foregoing description those skilled in the art will appreciate that numerous modifications may be made of this invention without departing from its spirit. Therefore we do not intend to limit the breadth of this invention to the embodiments illustrated and described.

What is claimed is:

1. A multibeverage dispenser comprising
   a stand and a visual display bowl mounted on the stand,
   a refrigeration system provided in the stand with evaporator coils disposed in operative relationship to the bowl for cooling liquid in it,
   a valve assembly supported on the stand and having a plurality of individual dispensing valves with each having its own actuator,
   means connected to the bowl for filling the bowl with water so that it may be refrigerated in it and means connected between the bowl and the valve assembly for directing the refrigerated water in the bowl to each of the dispensing valves,
   means for directing a flavor syrup to each of the valves, and
   means responsive to the actuation of any of the actuators for discharging the refrigerated water through its valve and the flavor syrup connected to that valve.

2. A multibeverage dispenser as described in claim 1 further characterized by
   said means for directing the flavor syrup comprising a plurality of coils for carrying flavor syrup provided in the bowl and connected at one end to a syrup source and at the other end to the separate valves for cooling the syrups before they flow to the valves.

3. A multibeverage dispenser comprising
   a stand and a bowl mounted on the stand,
   a refrigeration system provided in the stand with evaporator coils disposed in operative relationship to the bowl for cooling liquid in it,
   a valve assembly supported on the stand and having a plurality of individual dispensing valves with each having its own actuator,
   means for directing water into the bowl and means for directing a flavor syrup to each of the valves,
   means responsive to the actuation of any of the actuators for discharging water from the bowl through its valve and the flavor syrup connected to that valve,
   each valve including a water passage and a separate syrup passage,
   a valve closure disposed in each of the passages,
   valve stems connected to each of the closures and each stem positioned to be simultaneously actuated by the actuator, and
   an orifice provided in at least one of the passages of each valve and variable in size in response to changes of pressure in the passage for maintaining the flow rate constant through that passage with changes in pressure.

4. A multibeverage dispenser as defined in claim 2 further characterized by
   each valve including a water passage and a separate syrup passage,
   said means connected between the bowl and the valve assembly including a manifold which feeds each of the water passages in the valves,
   a valve closure disposed in each of the passages, and
   valve stems connected to each of the closures and each stem positioned to be simultaneously actuated by the actuator.

5. A multibeverage dispenser comprising
   a stand and a bowl mounted on the stand,
   a refrigeration system provided in the stand with evaporator coils disposed in operative relationship to the bowl for cooling liquid in it,
   a valve assembly supported on the stand and having a plurality of individual dispensing valves with each having its own actuator,
   means for directing water into the bowl and means for directing a flavor syrup to each of the valves,
   a manifold connecting the bowl to each of the valves for directing water from the bowl to each valve,
   a circulating pump disposed in the bowl which draws water from the bowl,
   a water duct connected from the outlet of the pump and into the manifold for directly circulating water from the pump to the manifold when the pump is running, and
   means responsive to the actuation of any of the actuators for discharging water and flavor syrup from its valve.

6. A multibeverage dispenser as defined in claim 5 further characterized by
   a line for directing water in the bowl into the manifold by gravity,
   a stand pipe connected to the outlet of the pump for spraying the water upwardly in the bowl, and
   another outlet from the pump and a duct connected to it for force feeding water in the bowl into the manifold.

7. A multibeverage dispenser as defined in claim 6 further characterized by
means for introducing a water carbonating agent into the bowl.

8. A multibeverage dispenser as defined in claim 1 further characterized by
means provided in the bowl for carbonating the water in it.

9. A multibeverage dispenser comprising
a stand and a bowl mounted on the stand,
a refrigeration system provided in the stand with evaporator coils disposed in operative relationship to the bowl for cooling liquid in it,
a valve assembly supported on the stand and having a plurality of individual dispensing valves with each having its own actuator,
means for directing water into the bowl and means for directing a flavor syrup to each of the valves,
means provided in the bowl for carbonating the water in it,
means responsive to the actuation of any of the actuators for discharging water from the bowl through its valve and the flavor syrup connected to that valve, and
means provided in one of the valves for dispensing water from the tank without dispensing syrup.

10. A multibeverage dispenser comprising
a stand and a bowl mounted on the stand,
a refrigeration system provided in the stand with evaporator coils disposed in operative realtionship to the bowl for cooling liquid in it,
a valve assembly supported on the stand and having a plurality of individual dispensing valves with each having its own actuator,
means for directing water into the bowl and means for directing a flavor syrup to each of the valves,
means connected between the bowl and valve assembly for directing water from the bowl to each of the valves,
each valve including a water passage and a separate syrup passage,
a valve closure disposed in each of the passages,
valve stems connected to each of the closures and each stem positioned to be simultaneously actuated by the actuator,
said actuators each including a pusher stem pivotally mounted for movement about a horizontal axis and disposed rearwardly of the valve assemblies, pivotally mounted plates on the front of the assemblies and mounted for movement about a vertical axis.
each of the stems engaging the plate the same distance from its vertical axis, and
a connecting rod joining the pusher stems and plates whereby actuation of the pusher stems causes the plates to open the closures.

11. A multibeverage dispenser as described in claim 10 further characterized by
an additional water passage in one of the valves, and
means for opening and closing that valve passage independently of the actuator.

12. A multibeverage dispenser as described in claim 11 further characterized by
said additional passage having a small diameter discharge spout to discharge a jet of water.

13. A multibeverage dispenser as described in claim 11 further characterized by
means for actuating the valve stem in the first recited water passage independently of the stem in the syrup passage.

14. A valve assembly comprising
a plurality of valves each having a body,
a pair of passages through each body, closures in each passage and valve stems connected to the closures,
a pivotally mounted pusher plate on each valve and engaging the stems of the respective valve for simultaneously actuating them,
an actuator connected to the plate for moving it against the stems,
a manifold connected to each valve for supplying water to one passage in each valve, and
separate syrup passages connected to the other passages in each valve.

15. A multibeverage dispenser as described in claim 14 further characterized by
an additional water passage in one of the valves, and
means for opening and closing that additional passage independently of the actuator.

16. A multibeverage dispenser as described in claim 15 further characterized by
said additional passage having a small diameter discharge spout to discharge a jet of water.

17. A multibeverage dispenser as described in claim 16 further characterized by
means for actuating the valve stem in the first recited water passage independently of the stem in the syrup passage.

18. A multibeverage dispenser as defined in claim 1 further characterized by
each valve including a water passage and a separate syrup passage,
said means connected between the bowl and the valve assembly including a manifold which feeds each of the water passages in the valves,
a valve closure disposed in each of the passages, and
valve stems connected to each of the closures and each stem positioned to be simultaneously actuated by the actuator.

19. A multibeverage dispenser as defined in claim 2 further characterized by
a circulating pump disposed in the bowl which draws water from the bowl, and
a water duct connected from the outlet of the pump and into the manifold for directly circulating water from the pump to the manifold when the pump is running.

References Cited
UNITED STATES PATENTS 3,209,952  10/1965  Cornelius.
3,277,921  10/1966  Cornelius _________ 137—607

STANLEY H. TOLLBERG, Primary Examiner

U.S. Cl. X.R.
137—607; 222—146